US008312118B2

(12) United States Patent
Weseloh

(10) Patent No.: US 8,312,118 B2
(45) Date of Patent: Nov. 13, 2012

(54) METHOD FOR REMOTE MAINTENANCE OF TECHNICAL DEVICES

(75) Inventor: Dirk Weseloh, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 2992 days.

(21) Appl. No.: 10/807,691

(22) Filed: Mar. 24, 2004

(65) Prior Publication Data

US 2004/0255004 A1 Dec. 16, 2004

Related U.S. Application Data

(60) Provisional application No. 60/457,123, filed on Mar. 24, 2003.

(30) Foreign Application Priority Data

Mar. 24, 2003 (DE) ................................. 103 13 271

(51) Int. Cl.
*G06F 15/173* (2006.01)

(52) U.S. Cl. ........ 709/223; 709/203; 709/217; 709/220; 709/229

(58) Field of Classification Search .................. 709/201, 709/219, 221, 224, 225, 229, 203, 217, 220, 709/223
See application file for complete search history.

(56) References Cited

U.S. PATENT DOCUMENTS

| 5,524,135 | A | * | 6/1996 | Mizikovsky et al. | 455/419 |
|---|---|---|---|---|---|
| 5,734,831 | A | * | 3/1998 | Sanders | 709/223 |
| 6,012,100 | A | * | 1/2000 | Frailong et al. | 709/250 |
| 6,035,402 | A | * | 3/2000 | Vaeth et al. | 726/2 |
| 6,151,643 | A | * | 11/2000 | Cheng et al. | 710/36 |
| 6,167,358 | A | * | 12/2000 | Othmer et al. | 702/188 |
| 6,170,019 | B1 | | 1/2001 | Dresel et al. | |
| 6,182,129 | B1 | * | 1/2001 | Rowe et al. | 709/221 |
| 6,393,569 | B1 | * | 5/2002 | Orenshteyn | 726/4 |
| 6,646,564 | B1 | * | 11/2003 | Azieres et al. | 340/679 |
| 6,857,013 | B2 | * | 2/2005 | Ramberg et al. | 709/223 |
| 6,928,464 | B2 | * | 8/2005 | Appiah et al. | 709/204 |
| 6,961,448 | B2 | * | 11/2005 | Nichols et al. | 382/115 |
| 6,973,569 | B1 | * | 12/2005 | Anderson et al. | 713/156 |

(Continued)

FOREIGN PATENT DOCUMENTS

DE 10029455 A1 7/2001

(Continued)

*Primary Examiner* — Michael Won
(74) *Attorney, Agent, or Firm* — Schiff Hardin LLP

(57) ABSTRACT

A method for remote maintenance of a technical device by a maintenance technician by a maintenance computer as well as a computer-readable storage medium on which is stored information for execution of the method on a data processing device. In the method, a remote data connection is established between the maintenance computer and the technical device, electronic access information dependent on a scope of intended access to data stored in the technical device is transmitted from the maintenance computer to the technical device an electronic identifier identifying the maintenance technician is transmitted from the maintenance computer to the technical device, an approval by an operating personnel of an access is determined by the technical device dependent on access information and the identifier, and by the technical device, electronic authentication information is generated by the technical device dependent on the determination of the approval.

7 Claims, 2 Drawing Sheets

U.S. PATENT DOCUMENTS

| | | | |
|---|---|---|---|
| 7,085,824 B2 * | 8/2006 | Forth et al. | 709/221 |
| 7,139,819 B1 * | 11/2006 | Luo et al. | 709/223 |
| 7,251,831 B2 * | 7/2007 | Gilbert et al. | 726/25 |
| 7,302,570 B2 * | 11/2007 | Beard et al. | 713/171 |
| 7,308,482 B2 * | 12/2007 | Smith et al. | 709/217 |
| 7,314,169 B1 * | 1/2008 | Jasper et al. | 235/382 |
| 2003/0118353 A1 * | 6/2003 | Baller et al. | 399/8 |
| 2004/0100650 A1 | 5/2004 | Landau et al. | |

FOREIGN PATENT DOCUMENTS

| | | |
|---|---|---|
| DE | 10065668 A1 | 8/2001 |
| EP | 1260906 | 2/1968 |

* cited by examiner

METHOD FOR REMOTE MAINTENANCE OF TECHNICAL DEVICES

CLAIM FOR PROVISIONAL APPLICATION BENEFITS

Benefit of the U.S. Provisional patent application Ser. No. 60/457,123 filed Mar. 24, 2003, is hereby claimed. The entire contents of the provisional application is incorporated herein by reference.

BACKGROUND OF THE INVENTION

1. Field of the Invention

The present invention relates generally to a method for remote maintenance of technical devices as well as a computer-readable storage medium on which is provided a program to execute the method on a data processing device.

2. Description of the Related Art

Technical devices such as, for example, computers, medical-technical image devices, medical workstations, industrial system controls or automobiles and airplanes are as a rule serviced by highly-specialized maintenance technicians. Maintenance measures can include both the remedy of technical errors and the modification of the functionality of the technical device. Different maintenance technicians are frequently used for different maintenance measures. Additionally, maintenance technicians are specialized to different technical devices as well as to different components of devices.

The high degree of specialization makes the selection of a suitable maintenance technician dependent on the respective device and on the respective necessary maintenance measure. In order to be able to implement maintenance measures quickly and flexibly, maintenance teams that implement maintenance measures via remote data connections are becoming accepted in increasing measure.

However, the remote maintenance of technical devices brings with it problems for the security of electronic data of the technical devices. On the one hand, a remote data connection that is to be established from a maintenance technician to a device to be serviced must be protected from unauthorized access by a third party. For this purpose, for example, encrypted data connections, non-public data lines or password-protected data access can be resorted to. In all cases, the establishment of a remote data connection by one of the technical devices is only then allowed when a successful electronic identification of the connection partner has been implemented.

On the other hand, the remote maintenance brings with it the problem that a maintenance technician can in principle also obtain access to confidential data stored in the device to be serviced. Depending on the data access rights of the maintenance technician necessary for the servicing operation, such a possibility of access to confidential data can be an undesired side effect. The possibility of access can, however, also be necessary for maintenance to be performed and can be indispensable for the completion of the maintenance. The latter can, for example, be the case when an error behavior of the technical device can only be demonstrated by accessing confidential data.

The confidential data can, for example, be patient data, secret research papers, development information as well as know-how or demographic data. The servicing of devices that work with such data can make the access to these data necessary, however it can also make necessary only a partial access, or can be possible completely without access. The extent of the necessary data access can be estimated by the maintenance technician in the preliminary stages of a maintenance measure using the intended maintenance measure.

However, the rigid limitation of the data access rights to a previously estimated necessary scope of access would make the implementation of maintenance measures inflexible. In addition to this, a specialist that possesses sufficient knowledge of the device would have to conduct the maintenance measure on the side of the technical device in order to be able to adjust the data access rights to the scope estimated by the maintenance technician. However, as stated above, it could be required that the access to confidential data is necessary for specific maintenance measures. The access to specific confidential data, for example patient data, can, however, be completely prohibited via legal regulations for an employee (thus, for example, for a maintenance technician from outside the company) who is not approved for the work with the technical device and the confidential data.

Conventional mechanisms to monitor data access rights, on the one hand, do not exhibit the necessary flexibility to enable adaptations of the access rights by a non-specialist operating personnel on the side of the device to be maintained, dependent on an intended maintenance measure. This can require in all cases only administrators and technical experts. On the other hand, they offer no possibility on a legal basis to enable access to data by maintenance technicians outside the firm that may not be allowed such an access based on confidential or legal regulations.

SUMMARY OF THE INVENTION

The present invention provides a method for remote maintenance of technical devices that enables a flexible regulation of data accesses by maintenance technicians under compliance with particularly strong legal limitations of data access rights.

A fundamental idea of embodiments of the invention is to provide a method for remote maintenance of a technical device by a maintenance technician by means of a maintenance computer, including a) in a first step, a remote data connection is established between the maintenance computer and the technical device, b) in a further step, electronic access information dependent on a scope of intended access to data stored in the technical device is transmitted from the maintenance computer to the technical device, c) in a further step by the maintenance computer, an electronic identifier identifying the maintenance technician is transmitted to the technical device, d) in a further step by the technical device, an approval by an operating personnel of an access is determined dependent on access information and the identifier, and e) in a further step by the technical device, electronic authentication information is generated dependent on the determination of the approval.

Embodiments of the method exhibit the advantage that first a remote data connection that allows a first data access is established independent of the intended data access, based on which the scope of the intended maintenance measure and of the necessary connected data access can be planned. Dependent on this planning, the scope of the intended data access can be flexibly reacted to, in that information about the extent of data access, as well as an identification of the data accesser, is transmitted via the already existing remote data connection, based on which the approval of an operating personnel on the side of the technical device can be determined.

The approval thereby concerns not the configuration and the extent of access of the remote data connection as such, but rather the intended data access as such that should ensue by a specific maintenance technician who is in principle not designated for the work with the confidential data in question. Electronic information dependent on this approval is transmitted to the maintenance computer, whereby a particular arrangement can be made between the maintenance technician and the operating personnel that refers to the intended data access.

The materialization of this particular agreement can be designed such that particularly strong legal limitations of data access rights are thereby satisfied. For example, in this manner a work relationship between the maintenance technician and the technical device, that is temporally limited to the duration of the maintenance work, could be established, which enables a legitimation for the data access. The flexibility of the data access is, however, not limited, since the approval does not include the ability to adapt and allow the data access rights via technical measures corresponding to the planned maintenance extent. Rather, the approval has the character of a clarification of understanding that specially authorizes the maintenance technician for data access. For this reason, the approval can also be given by an operating personnel who is not a specialist for interaction with the technical device.

BRIEF DESCRIPTION OF THE DRAWINGS

Exemplary embodiments of the invention are subsequently explained in detail using Figures.

DETAILED DESCRIPTION OF THE PREFERRED EMBODIMENTS

Figure 1:
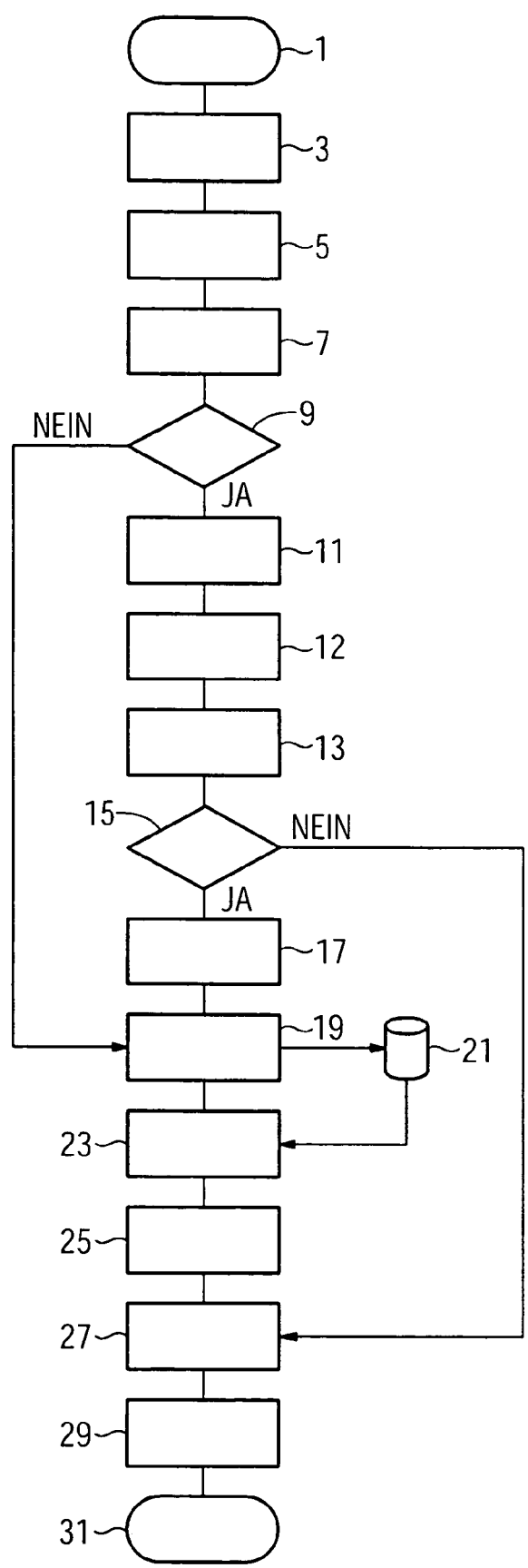
FIG. 1 is a flow chart showing the method steps for remote maintenance according to the present invention.

The invention, in preferred embodiments, provides a method in which authentication information is transmitted by a technical device to a maintenance computer. The authentication information can thereby be exchanged between both parties in real time, and an agreement for maintenance purposes can quickly materialize.

In a further advantageous embodiment of the invention, information dependent on the authentication information is printed out by the technical device. This information can, for example, be printed out in the form of a written agreement that is then directly present to the operating personnel of the technical device in order, for example, for the operating personnel to sign and fax to the maintenance technician. This also allows the simple and fast accomplishment of the agreement in written form.

In a further advantageous embodiment of the invention, electronic termination information that is dependent on the end of the access is transmitted from the maintenance computer to the technical device. The operating personnel of the technical device can thereby be informed in real time about the end of the maintenance work. In addition to this, the end of an agreement made between maintenance technician and operating personnel for maintenance purposes can also be directly communicated and documented with the termination information. The end of the access can thereby ensue independent of a release of the remote data connection and relates only to a specified, concluded maintenance measure.

In a further embodiment of the invention, an electronic documentation of the accesses that is effected by means of the measurement event is transmitted from the maintenance computer to the technical device. This documentation is then available at the technical device in order to make traceable the accesses of the maintenance technician to data as well as to components of the technical device. Moreover, all access to confidential data can be documented in this manner in order to be completely reconstructable after the event. This documentation can in particular serve to satisfy strong legal requirements for the documentation of data accesses to confidential data, for example patient records.

In a further advantageous embodiment of the invention, electronic data that has been transmitted from the technical device to the maintenance computer and stored by the maintenance computer is automatically deleted by the maintenance computer from the maintenance computer dependent on a termination of the access. It can thereby be ensured that confidential data, for example electronic patient records, can in fact be accessed for maintenance purposes, however the confidential patient records do not remain at locations not approved for the information after conclusion of the maintenance. The deletion of the data can serve to fulfill particularly strong legal requirements for the confidentiality and security of such data.

In a further advantageous embodiment of the invention, the extent of an intended data access is automatically determined. After establishment of the remote data connection between the technical device and the maintenance computer, a first error diagnosis can thereby be implemented dependent on the existing plan of the intended maintenance measure. The maintenance measure can thereby, for example, automatically be planned using the already established remote data connection, according to which a likewise automatic first error diagnosis has been implemented. However, the method can also run semi-automatically, in that a first diagnosis is effected by a maintenance technician who thereupon plans the maintenance measures intended to be performed by the technician by means of the maintenance computer. The automatic planning of the extent of the data access then ensues dependent on the inputs of the maintenance technician. The intended extent of the data access can thereby, for example, be associated with one or more predefined levels. Each level is thereby connected with a specific data access right.

The method for remote maintenance of a technical device is shown in individual method steps in FIG. 1. The maintenance method begins in step 1, in that, for example, a maintenance technician is notified by an operating personnel of a technical device. The notification can ensue via e-mail, fax or telephone. It can also be automatically generated and transmitted by the technical device 55 upon occurrence of errors.

In step 3, the maintenance technician establishes a remote data connection 53 from a maintenance computer 51 to the technical device 55 to be maintained. The remote data connection can thereby comprise a modem connection, an intranet connection, an Internet connection or another connection between the maintenance computer 51 and the technical device 55. The technical device 55 can be both a computer and another technical device with electronic control and remote data connection means.

In step 5, a first analysis of the intended maintenance measure is implemented by the maintenance technician or the maintenance computer 51. For example, an error behavior of the technical device 55 can be analyzed or a change of the configuration of the technical device 55 can be planned. The analysis can be manually implemented by the maintenance technician and be based on information that is transmitted with the specification of the maintenance measures. The analysis can also be automatically implemented by the maintenance computer 51, which for this purpose can query configuration data, user documentations or function parameters of the technical device 55.

In step 7, the extent of the intended maintenance measure and the extent of the intended data accesses connected thereto is planned. In principle, a differentiation is made between accesses to confidential data and accesses to non-confidential data. Maintenance measures that need no access to confidential data require no further particular precautions and can be directly implemented. In contrast to this, maintenance measures that require an access by the maintenance computer 51 to confidential electronic data require the particular approval of the possessor of the electronic data or of operating personnel authorized to access these data.

The planning of the intended scope of data accesses is thus differentiated primarily between access to confidential data and access to non-confidential data. Moreover, accesses to confidential data can differ in different extent and be correspondingly classified with regard to their extent of access. The classification can, for example, be adapted to whether image data, text data, personal statements, measurement data or diagnosis data should be accessed.

In step 9, using the planning of the intended data access a differentiation is made as to whether confidential data should be accessed.

In the event that confidential data is not to be accessed, the step 19 with the intended maintenance measures can be directly carried out.

In the event that confidential data is to be accessed, in step 11 electronic information that is dependent on the intended extent of data access is transmitted from the maintenance computer 51 to the technical device 55. This information can, for example, comprise specifications for the data to be accessed as well as for the type of data accesses. However, it can also comprise an agreement about the intended data accesses, in the manner that a draft agreement is transmitted that contains the contractual approval of the operating personnel to an access by the maintenance technician to the confidential data. Such a contract could, for example, contain the establishment of a temporary—limited to the duration of the maintenance work—work relationship between the maintenance technician and the technical device.

In step 12, an electronic identifier that identifies the maintenance technician is transmitted from the maintenance computer 51 to the technical device 55. The identifier can either individually and unambiguously identify the maintenance technician or it can, for example, specify the role of the maintenance technician.

In step 13, the technical device 55 shows information for intended maintenance access and for the identity or role of the maintenance technician to an operating personnel via a display device, for example a monitor. In a preferred embodiment, the display comprises a pop-up window that shows an agreement that authorizes the maintenance technician for the data access in the intended extent of access.

The wording of this agreement can either have been transmitted from the maintenance computer 51 or it can be available on the side of the technical device 55. The content of the agreement can thereby be varied depending on the intended extent of the data access, or a standard agreement, for example in the form of a document template, can be specially available for each extent of data access. In a further embodiment, instead of an agreement only information about the extent of the intended data access as well as the maintenance technician or, respectively, his role can be communicated to an operating personnel.

In step 15, the operating personnel of the technical device 55 obtains the possibility to allow the intended data access or to refuse it. The decision can be made directly on the display device of the technical device 55 via input of the approval or refusal, for example by means of keyboard or mouse. In another embodiment, the decision can be made in that the information or, respectively, the agreement shown in the preceding step is printed out by the technical device 55 and is approved in written form by an operating personnel.

In the event that the operating personnel gives no approval to the intended data access, the planned maintenance measure is cancelled in the step 27 specified below.

In the event that the operating personnel has given approval to the data access, in step 17 an electronic signal dependent on this approval is generated that is either directly transmitted from the technical device 55 to the maintenance computer 51, or effects the generation of a printout that can then, for example, be faxed.

In the event that the approval of the operating personnel has been directly input on the monitor of the technical device 55, the transmission ensues via the remote data connection 53 and can be directly displayed to the maintenance technician. In the event that the approval has been given in writing on a printout, it can be transmitted via fax or sent via post. In this case, the maintenance technician does not receive the approval or, respectively, the contractual agreement for the intended maintenance access in quite as real time as given the transmission via the remote data connection 53. This possibility can namely be used for documentation purposes, in order, for example, to centrally archive agreements or, respectively, approvals for data accesses.

In step 19, the maintenance technician undertakes maintenance measures via the already established remote data connection 53 by means of the maintenance computer 51. The maintenance personnel abides by the scope of data access previously approved by the operating personnel of the technical device 55, in order to operate in the previously arranged framework of the data access. For this purpose, the remote data connection 53 does not have to be adapted and be technically limited with regard to its access possibilities; instead of this, the maintenance technician abides by the agreed extent of access.

The maintenance measures performed by the maintenance technician are stored in a suitable manner in a document storage 21 in order to be completely reconstructable at any time after the event.

In step 23, the information stored in the document storage 21 for documentation purposes is transmitted from the maintenance computer 51 to the technical device 55. In particular, legal conditions for complete documentation of data accesses to confidential data can thereby be satisfied.

In step 25, the ending of the maintenance measure ensues either automatically via the maintenance computer 51 or manually by the maintenance technician. The end of the maintenance measure is thereby not identical with the release of the remote data connection 53, it means only the conclusion of the previously planned and implemented maintenance measure. Should it emerge, for example in the course of the implementation of this maintenance measure, that a change in the scope of the data access is necessary, running of the maintenance measure can be terminated and a maintenance measure can be commenced in the necessary, changed scope of access.

In step 27, the end of the maintenance measure is shown to an operating personnel via the technical device 55. The end of the maintenance measure is synonymous with the expiration of the approval of the operating personnel for a data access in the previously established scope. If the approval ensued in the framework of a contractual agreement, the end of the maintenance measure in step 27 is identical with the termination of the contractual agreement. For this purpose, for example a notice of termination conforming with the preceding agreement can be displayed to the operating personnel on a screen of the technical device 55.

In step 29, after the end of all maintenance measures, the remote data connection 53 is released, and in step 31 the maintenance method is ended.

Figure 2:
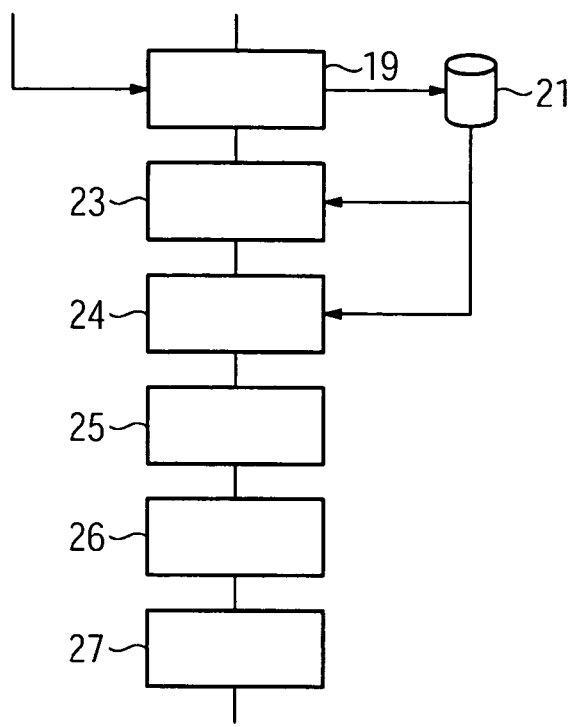
FIG. 2 is a flow chart of method steps for automatic deletion of data in connection with remote maintenance measures.

The method to delete confidential data from the maintenance computer 51 is shown in FIG. 2. In step 19, the implementation of maintenance measures and their storage for documentation purposes in the documentation storage 21 thereby ensues as described before. In step 23, as likewise specified before, the information stored for documentation purposed are transmitted to the technical device 55.

In step 24, the deletion of all data that have been transmitted from the technical device 55 to the maintenance computer 51 and stored by this during the maintenance measures ensues using the information stored for documentation purposes. The use of the documentation information thereby enables the complete deletion, such that it is subsequently ensured that no confidential data remains on the side of the maintenance computer 51.

The end of the maintenance measure ensues on the side of the maintenance computer 51 in step 25, as specified before.

In step 26, the successful deletion of all confidential data that ensued previously in step 24 on the side of the maintenance computer 51 is confirmed by the operating personnel of the technical device 55 in connection with the end of the maintenance measure.

In step 27, as specified previously, the end of the maintenance measures is shown by the technical device 55 in the form of a notice of termination of the previously made agreement.

Figure 3:
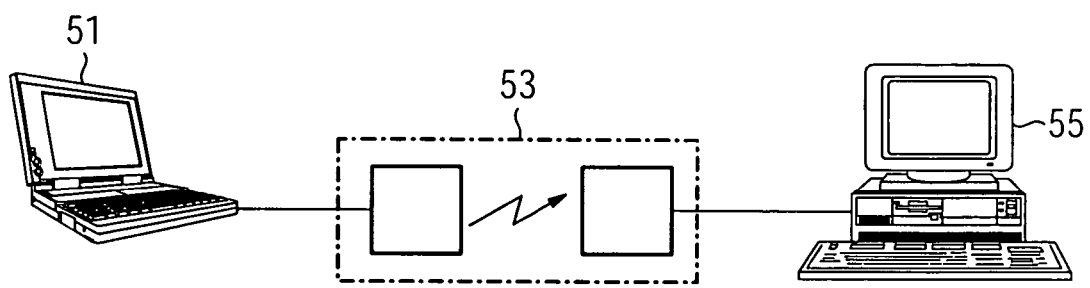
FIG. 3 is a schematic diagram of a system made up of a maintenance computer and a technical device.
Figure 3:
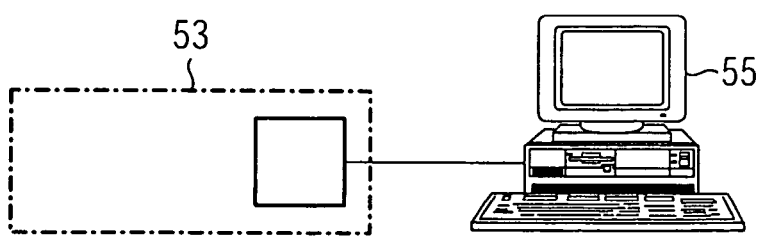

A system for maintenance of a technical device 55 is shown in FIG. 3. The technical device 55 can thereby be, for example, a computer of a computer control of a device. A maintenance computer 51, for example a computer or a notebook, is connected with the technical device 55 via a remote data connection 53. The remote data connection 53 can thereby comprise a modem connection, an intranet connection, an Internet connection or other data connections. A further technical device 55 is exemplarily shown that likewise has access to a remote data connection 53, however is not connected with the maintenance computer 51.

The information necessary for execution of the method on a data processing device can be stored on a computer-readable storage medium. The storage medium can be, for example, a diskette, a diskette packet, a fixed disk, or a server. The information stored thereon can interact with a data processing device in order to, for example, execute the method on the data processing device or install a program on the data processing device that is necessary for execution.

Although other modifications and changes may be suggested by those skilled in the art, it is the intention of the inventors to embody within the patent warranted hereon all changes and modifications as reasonably and properly come within the scope of their contribution to the art.

I claim:

1. A method for remote maintenance of a technical device by a maintenance technician by a maintenance computer, comprising the steps of:
    establishing a remote data connection between the maintenance computer and the technical device to be maintained;
    transmitting electronic access information describing a scope of intended access to data stored in the technical device from the maintenance computer to the technical device to be maintained, said data being understood to be confidential by an operating personnel for the technical device;
    transmitting an electronic identifier identifying the maintenance technician from the maintenance computer to the technical device to be maintained;
    determining an approval by said operating personnel of an access to the technical device dependent on the access information describing the scope of the intended access to the data and the identifier;
    generating electronic authentication information by the technical device dependent on the determination of the approval;
    transmitting said authentication information from the technical device to the maintenance computer;
    with said maintenance computer, conducting said remote maintenance of said technical device, said maintenance computer receiving from said technical device confidential data which was authorized based on said approval; and
    automatically deleting electronic data from the maintenance computer that has been transmitted from the technical device to the maintenance computer and stored in the maintenance computer dependent on termination of the access.

2. A method according to claim 1, further comprising the step of:
    printing information by the technical device dependent on the authentication information.

3. A method according to claim 1, further comprising the step of:
    transmitting electronic termination information dependent on a termination of the access from the maintenance computer to the technical device.

4. A method according to claim 1, further comprising the step of:
    transmitting electronic documentation of accesses effected by the maintenance computer from the maintenance computer to the technical device.

5. A method according to claim 1, further comprising the step of:
    automatically determining an extent of an intended data access during the remote maintenance.

6. A method for remote maintenance of a technical device by a maintenance technician by a maintenance computer, comprising the steps of:
    establishing a remote data connection between the maintenance computer and the technical device to be maintained;
    transmitting electronic access information describing a scope of intended access to data stored in the technical device from the maintenance computer to the technical device to be maintained, said data being understood to be access sensitive by an operating personnel for the technical device;

transmitting an electronic identifier identifying the maintenance technician from the maintenance computer to the technical device to be maintained;

determining an approval by said operating personnel of an access to the technical device dependent on the access information describing the scope of the intended access to the data and the identifier;

generating electronic authentication information dependent on the determination of the approval;

transmitting said authentication information to the maintenance computer; and with said maintenance computer, conducting said remote maintenance of said technical device, said maintenance computer receiving from said technical device data considered to be access sensitive which was authorized based on said approval; and automatically deleting electronic data in the maintenance computer that has been transmitted from the technical device to the maintenance computer and stored in the maintenance computer dependent on termination of the access.

7. A computer-readable medium comprising a computer program for remote maintenance of a technical device by a maintenance technician by a maintenance computer having said computer program, said program performing the steps of:

establishing a remote data connection between the maintenance computer and the technical device to be maintained;

transmitting electronic access information describing a scope of intended access to data stored in the technical device from the maintenance computer to the technical device to be maintained, said data being understood to be confidential by an operating personnel for the technical device;

transmitting an electronic identifier identifying the maintenance technician from the maintenance computer to the technical device to be maintained;

receiving approval by said operating personnel of an access to the technical device dependent on the access information describing the scope of the intended access to the data and the identifier;

receiving electronic authentication information generated by the technical device dependent on the determination of the approval;

receiving said authentication information from the technical device; and conducting said remote maintenance of said technical device, said maintenance computer receiving from said technical device confidential data which was authorized based on said approval; and automatically deleting electronic data in the maintenance computer that has been transmitted from the technical device to the maintenance computer and stored in the maintenance computer dependent on termination of the access.

* * * * *